United States Patent

[11] 3,585,817

[72] Inventors Leo A. McCafferty, Jr.
Baltimore;
Robert G. Moores, Jr., Towson, both of, Md.
[21] Appl. No. 851,374
[22] Filed Aug. 19, 1969
[45] Patented June 22, 1971
[73] Assignee The Black and Decker Manufacturing Company
Towson, Md.

[54] ADJUSTABLE CLUTCH CONSTRUCTION
12 Claims, 6 Drawing Figs.
[52] U.S. Cl.................................................. 64/30C,
81/52.4, 151/41.5, 173/12, 173/109, 267/177
[51] Int. Cl....................................................... F16d 7/02,
F16b 39/28
[50] Field of Search............................................ 64/29, 30
R, 30 C; 192/56; 267/170, 172, 174, 175, 176,
177; 173/109, 12; 151/41, 41.5; 81/52.4

[56] References Cited
UNITED STATES PATENTS
| | | | |
|---|---|---|---|
| 1,138,179 | 5/1915 | Bayles | 151/41.5 (X) |
| 1,451,999 | 4/1923 | Perry | 151/41.5 (X) |
| 1,463,497 | 7/1923 | Bugatti | 81/52.4 |
| 1,488,069 | 3/1924 | Seago | 151/41.5 (X) |
| 1,874,888 | 8/1932 | Burrell | 81/52.4 (UX) |
| 2,430,606 | 11/1947 | Franz | 151/41.5 |
| 2,654,407 | 10/1953 | Dremel | 81/52.4 (X) |
| 2,716,875 | 9/1955 | Hill et al. | 64/29 |
| 3,396,557 | 8/1968 | Moores, Jr. | 64/30 |

Primary Examiner—Allan D. Hermann
Attorneys—Leonard Bloom and Joseph R. Slotnik

ABSTRACT: A portable power tool including a housing having an integral handle. A motor within the housing imparts rotation or longitudinal percussion or both to a tool bit which is engageable with a work surface. A novel adjustable friction clutch forming part of a drive train which transmits rotation to the bit, interconnects two shafts to transmit rotary movement therebetween but allows one shaft to slip relative to the other such as when the bit becomes frozen in the work.

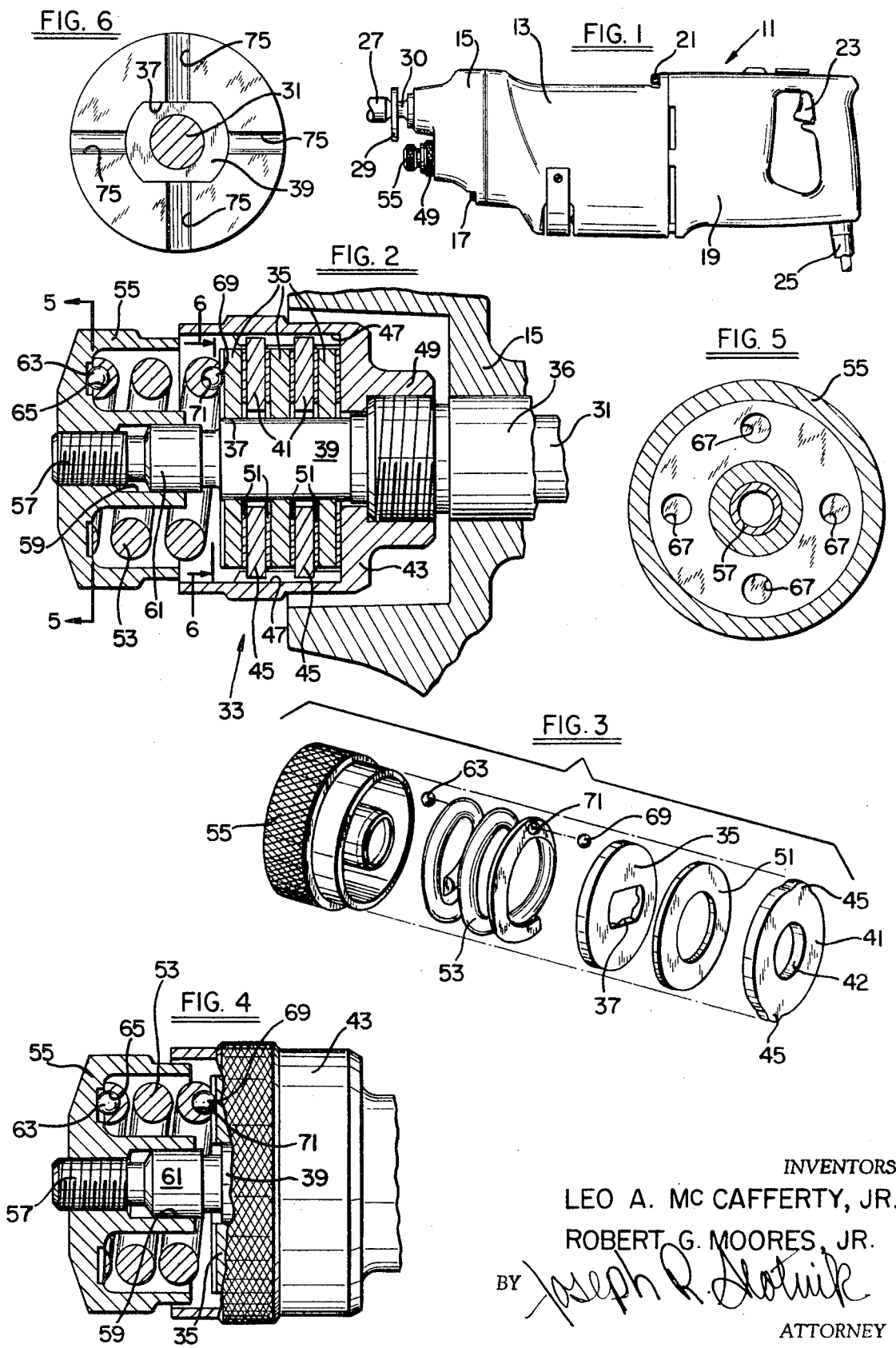

ADJUSTABLE CLUTCH CONSTRUCTION

SUMMARY OF THE INVENTION

This invention is directed to a novel rotary slip clutch construction having input and output members. Frictional force is developed within the clutch by a resilient member acting on friction members connected to the clutch input and output members. The torque level at which slip occurs is readily adjustable through a member acting in the resilient member. The resilient member has means integrated therewith which acts on the adjustment member to retain it in its adjusted position and prevents unintended adjustment thereof.

Main objects of the present invention, therefore, are to provide a novel adjustable rotary slip clutch construction which facilitates ready adjustment of the torque level at which slip will occur but prevents unintended or accidental adjustment thereof.

Another important object of this invention is to provide a novel slip clutch construction of the above character which includes a minimum of separate parts and is compact and light in weight.

Additional objects are to provide a novel construction of the above character which is relatively inexpensive to manufacture, rugged in construction, and reliable in use.

Further objects and advantages of the invention will become more apparent with a consideration of the detailed description to follow taken in conjunction with the claims annexed hereto.

BRIEF DESCRIPTION OF THE DRAWINGS

FIG. 1 is a side elevational view illustrating a power tool embodying the present invention;

FIG. 2 is an enlarged sectional view of a portion of FIG. 1 illustrating the clutch of the present invention;

FIG. 3 is an exploded perspective view of some of the clutch parts of FIG. 2;

FIG. 4 is a view similar to FIG. 2 but illustrating the clutch parts in another adjusted position;

FIG. 5 is a sectional view of FIG. 2 taken along the line 5-5 thereof; and

FIG. 6 is a sectional view of FIG. 2 taken along the line 6-6 thereof.

BROAD STATEMENT OF THE INVENTION

Broadly described, the present invention relates to a portable power tool of the type having a tool bit supported for rotation and longitudinal reciprocation, said tool having a transmission including a rotary slip clutch adapted to transmit rotary motion to said tool bit below a preselected torque level; the improvement in said tool wherein said clutch comprises input and output members, engageable first and second friction means connected to said input and output members, respectively, a coil spring normally biasing said first and second friction means into operative frictional engagement, adjustment means holding said resilient means in its biasing position and movable in directions toward and away from said resilient means to effect adjustment of the biasing force of said resilient means on said first and second friction means, said coil spring having an opening in one end thereof, and detent means including a ball partially disposed in said opening and cooperably receivable in recess means in said adjustment means to resist said movement of said adjustment means, whereby the biasing force of said resilient means inhibits said movement of said adjustment means.

In another aspect, the present invention relates to a rotary friction clutch comprising generally concentric rotary input and output members, first and second frictional plate means fixed for rotation with said input and output members, respectively, a compression spring biasing said first and second friction plate means into operative frictional engagement, a cage member threaded to said input member and holding said compression spring in biasing relation to said friction plate means and adapted when threaded along said input member to vary the biasing force of said spring on said friction plate means, detent means including a ball partially received in an opening formed in one end coil of said spring, said cage member having at least one pocket adapted to cooperably receive said ball, whereby to releasably hold said cage member against turning movement relative to said input member.

DETAILED DESCRIPTION

Referring now more specifically to the drawings, an electric powered, rotary hammer embodying the present invention is illustrated generally at 11 in FIG. 1; however, this tool is for purposes of illustration only and it is to be understood that the present invention finds more general use in the field of power driven rotary tools and particularly those which are subject to high impact forces during use.

With this in mind, the tool 11 is seen to include a case housing 13 having an end housing 15 secured thereto by screws 17. An end handle and gear case 19 is fixed to the case housing 13 by screws 21. The handle and gear case 19 has a trigger switch 23 and a conventional line cord 25 supported thereon.

The rotary hammer 11 is provided with a conventional electric motor (not shown) or other power source which may be positioned within the lower portion of the case housing 13 and which is adapted to impart longitudinal reciprocation and rotation to a tool bit 27. To reciprocate the tool bit 27, the motor (not shown) may have a rotating armature connected to a piston and floating ram by a gear and crank transmission so that the ram is reciprocated and hammers on the tool bit 27. One such construction is illustrated and described in detail in U. S. Pat. No. 3,203,490, granted Aug. 31, 1965, to G. W. McCarty et al., and owned by the assignee of the present application, and reference may be made thereto for a better understanding thereof.

A tool retainer plate 29 is carried upon the end housing 15 and is centrally apertured to rotatably and slidably receive a reduced diameter portion 30 of the tool bit 27. The retainer plate 29 is resiliently mounted on the end housing and prevents the tool bit 27 from pulling out of the end housing 15. For a detailed description of the mounting of the retainer plate 29, reference may be made to the U.S. Pat. to Moores, No. 3,454,284, granted July 8, 1969, and owner by the assignee of the present application.

As described above, the tool bit is adapted for rotation about its longitudinal axis as well as reciprocation therealong. To this end, the electric motor armature (not shown) has a shaft (not shown) drivingly interconnected to an input shaft 31 of a novel rotary slip clutch 33 (see FIG. 2). A hollow clutch output shaft 36 is concentric with the input shaft 31 and imparts rotation to the bit 27 through a gear train (not shown). Preferably, but not necessarily, the tool bit 27 has a hexagonal or splined shank slidably received in a complementary opening in a gear, the former being illustrated and described in the aforesaid McCarty et al. patent.

The slip clutch 33 is employed to prevent excessive reaction torque from being imparted to the operator. Thus, for example, when the bit 27 becomes frozen in a workpiece and cannot turn, the clutch 33 slips and prevents injury to the operator or damage to the tool.

As shown in FIG. 2, the slip clutch 33 includes a first set of plates 35 each having a noncircular opening 37 nonrotatably disposed on a complementary shaped portion 39 of the clutch input shaft 31. Arranged between adjacent ones of the plates 35 are respective ones of a second set of plates 41 having large openings 42 loosely disposed on the shaft portion 39. Each of the second plates 41 is keyed to a clutch housing 43 by radially projecting ears 45 on the plates 41 which are received in axial grooves 47 in the housing 43. The clutch housing 43 has a boss 49 threaded on the output shaft 36 so that the first set of plates 35 rotates with input shaft 31 while the second set of plates 41 rotates with the output shaft 36.

The plates 35, 41 are biased into operative frictional engagement by a coil compression spring 53 caged between the plates 35, 41 and a clutch cover 55 threaded on a reduced end 57 of the shaft 31. The plates 35, 41 may either directly engage in face-to-face relation, or they may operatively engage through spacer friction plates 51 which are loosely disposed upon the shaft portion and within the housing 43. The cover 55 is disposed wholly outside the end housing 15 and has a counterbored portion 59 piloted on a pilot portion 61 of the shaft 31 for stability. Thus, when it is desired to adjust the torque level at which the clutch 33 slips, the cover 55 is manually turned on the shaft 31 and is threaded up or back on the shaft end 57 depending on whether it is desired to raise or lower this torque level.

It will be appreciated that vibratory forces arise in the tool 11 during use. These forces tend to turn the clutch cover 55 thereby changing the torque level adjustment. In order to prevent this from occurring, novel means is provided on the spring 53 which prevents the clutch cover 55 from inadvertently or accidentally turning but which allows the clutch cover 55 to be easily adjusted when desired.

As shown in FIGS. 2—4, the spring 53 has a ball 63, constructed of hardened steel or other similarly durable material, seated in an opening 65 in its outermost coil. The ball 63 projects outwardly of this coil, preferably a distance of about (¼) to about (½) the ball diameter and is adapted to seat selectively in one of a plurality of generally complementary pockets 67 formed in a radial face of the clutch cover 55. Similarly, another ball 69 is seated in an opening 71 in the innermost spring coil 73. Like the ball 63, the ball 69 projects about (¼) to about (½) the ball diameter from the opening 71 and seats selectively in one of a plurality of recesses 75 formed in the adjacent face of the clutch plate 35.

It will be appreciated that the balls 63, 69 are biased into seated relation with the recesses 67, 75 by the force of the spring 53 and hold the clutch cover 55 in detent fashion against turning on the shaft end 57. This construction has been found to more than amply hold the clutch cover 55 from so turning under the action of vibratory forces which arise during normal tool use. However, when it is desired to adjust the torque level of the clutch 33, the clutch cover 55 can be turned with the balls 63, 69 readily camming into and out of successive recesses 67, 75. Advantageously, this camming action provides an audible click which alerts the operator as to the extent of clutch adjustment undergone.

Furthermore, this construction involves a minimum of parts (utilizing the spring 53 to generate both the clutch frictional force and the adjustment locking force), and minimizes the overall size and cost involved. The location of the balls 63, 69 in openings in the spring coils renders the detent balls virtually part of the spring 53. Thus, the axial dimension of the clutch 33 is less than it would be were a locking arrangement separate from the spring 53 used. However, the use of the separate balls allows them to be made from a wear resistant material without requiring that the entire spring be so made. Finally, the round configuration of the balls 63, 69 is highly desirable in facilitating ready camming into and out of the recesses 67, 75.

By the foregoing, there has been disclosed a novel slip clutch construction calculated to fulfill the inventive objects hereinabove set forth and while a preferred embodiment has been set forth herein, various additions, substitutions, modifications, and omissions may be made thereto.

We claim:

1. In a portable power tool of the type having a tool bit supported for rotation and longitudinal reciprocation, said tool having a transmission including a rotary slip clutch adapted to transmit rotary motion to said tool bit below a preselected torque level; the improvement in said tool wherein said clutch comprises input and output members, engageable first and second friction means connected to said input and output members, respectively, a coil spring normally biasing said first and second friction means into operative frictional engagement, adjustment means holding said resilient means in its biasing position and movable in directions toward and away from said resilient means to effect adjustment of the biasing force of said resilient means on said first and second friction means, said coil spring having an opening in one end thereof, and detent means including a ball partially disposed in said opening and cooperably receivable in recess means in said adjustment means to resist said movement of said adjustment means, whereby the biasing force of said resilient means inhibits said movement of said adjustment means.

2. The improvement of claim 1 wherein said ball is constructed of hardened steel.

3. The improvement as defined in claim 1 wherein said resilient means comprises a coil spring, said detent means including at least one ball carried in each end coil of said spring and cooperable with recess means in said adjustment means and said first friction means.

4. The improvement of claim 1, wherein said adjustment means includes a clutch cover threaded on said input member.

5. The improvement of claim 1 wherein said ball projects from said opening from about one-fourth to about one-half the diameter of said ball.

6. The improvement of claim 1 wherein said spring has an opening formed in the other end coil thereof, a ball disposed partially in said last-mentioned opening and cooperably receivable in at least one pocket in said first friction means.

7. The improvement of claim 6 wherein said adjustment means and said first friction means each has a plurality of pockets formed therein.

8. A rotary friction clutch comprising generally concentric rotary input and output members, first and second frictional plate means fixed for rotation with said input and output members, respectively, a compression spring biasing said first and second friction plate means into operative frictional engagement, a cage member threaded to said input member and holding said compression spring in biasing relation to said friction plate means and adapted when threaded along said input member to vary the biasing force of said spring on said friction plate means, detent means including a ball partially received in an opening formed in one end coil of said spring, said cage member having at least one pocket adapted to cooperatively receive said ball, whereby to releasably hold said cage member against turning movement relative to said input member.

9. A clutch as defined in claim 8 wherein said spring has a ball partially received in an opening in the other end coil thereof, said first friction plate means having at least one pocket adapted to cooperably receive said last-mentioned ball.

10. A clutch as defined in claim 9 wherein said cage member and said first friction plate means each has a plurality of spaced pockets adapted to cooperably receive said balls in selected threaded adjustment position of said cage member.

11. A clutch as defined in claim 9 wherein said balls are constructed of hardened steel.

12. A clutch as defined in claim 9 wherein said balls project from said spring openings from about one-fourth to about one-half the diameter of said balls.